United States Patent
Orihara

(10) Patent No.: US 9,501,414 B2
(45) Date of Patent: Nov. 22, 2016

(54) STORAGE CONTROL DEVICE AND STORAGE CONTROL METHOD FOR CACHE PROCESSING ACCORDING TO TIME ZONES

(71) Applicant: NEC Corporation, Minato-ku, Tokyo (JP)

(72) Inventor: Naoshi Orihara, Tokyo (JP)

(73) Assignee: NEC CORPORATION, Tokyo (JP)

(*) Notice: Subject to any disclaimer, the term of this patent is extended or adjusted under 35 U.S.C. 154(b) by 12 days.

(21) Appl. No.: 14/606,148

(22) Filed: Jan. 27, 2015

(65) Prior Publication Data
US 2015/0212949 A1    Jul. 30, 2015

(30) Foreign Application Priority Data
Jan. 29, 2014 (JP) .................. 2014-013893

(51) Int. Cl.
G06F 12/00 (2006.01)
G06F 12/08 (2016.01)

(52) U.S. Cl.
CPC ... *G06F 12/0873* (2013.01); *G06F 2212/1024* (2013.01)

(58) Field of Classification Search
CPC .............. G06F 12/0873; G06F 2212/1024
See application file for complete search history.

(56) References Cited

U.S. PATENT DOCUMENTS 8,135,911 B2 * 3/2012 Chan .................. G06F 12/0864
711/118

FOREIGN PATENT DOCUMENTS

| JP | 2002-373109 A | 12/2002 |
|----|---------------|---------|
| JP | 2003337721 A | 11/2003 |
| JP | 2009157749 A | 7/2009 |
| JP | 2010-152747 A | 7/2010 |
| WO | 2011/138972 A1 | 11/2011 |

OTHER PUBLICATIONS

Japanese Office Action for JP Application No. 2014-013893 mailed on Dec. 1, 2015 with English Translation.

* cited by examiner

*Primary Examiner* — John A Lane

(57) ABSTRACT

A storage control device capable of avoiding a decrease in performance related to accesses to a storage device from a start time of a certain time zone is provided. A schedule information storing unit 130 stores schedule information indicating target data in an access to a storage device in a predetermined time zone. The target data is a target of a cache control using a cache memory. A cache processing unit 120 performs the cache control for the access to the target data and an access to data other than the target data in a time zone except the predetermined time zone, and performs the cache control for the access to the target data in the predetermined time zone. A preprocessing unit 140 performs a preprocessing to make the cache memory available for the cache control of the target data by a start time of the predetermined time zone.

10 Claims, 8 Drawing Sheets

Fig. 4

| PREFERENTIAL TIME ZONE | | TARGET STORAGE REGION | OPERATION MODE |
|---|---|---|---|
| START TIME | TERMINATION TIME | | |
| 08:00 | 10:00 | S1a, S1b, S1c, S1d | READ PRIORITY |
| 17:00 | 19:00 | S5a, S5b | WRITE PRIORITY |
| : | : | : | : |

131 SCHEDULE INFORMATION

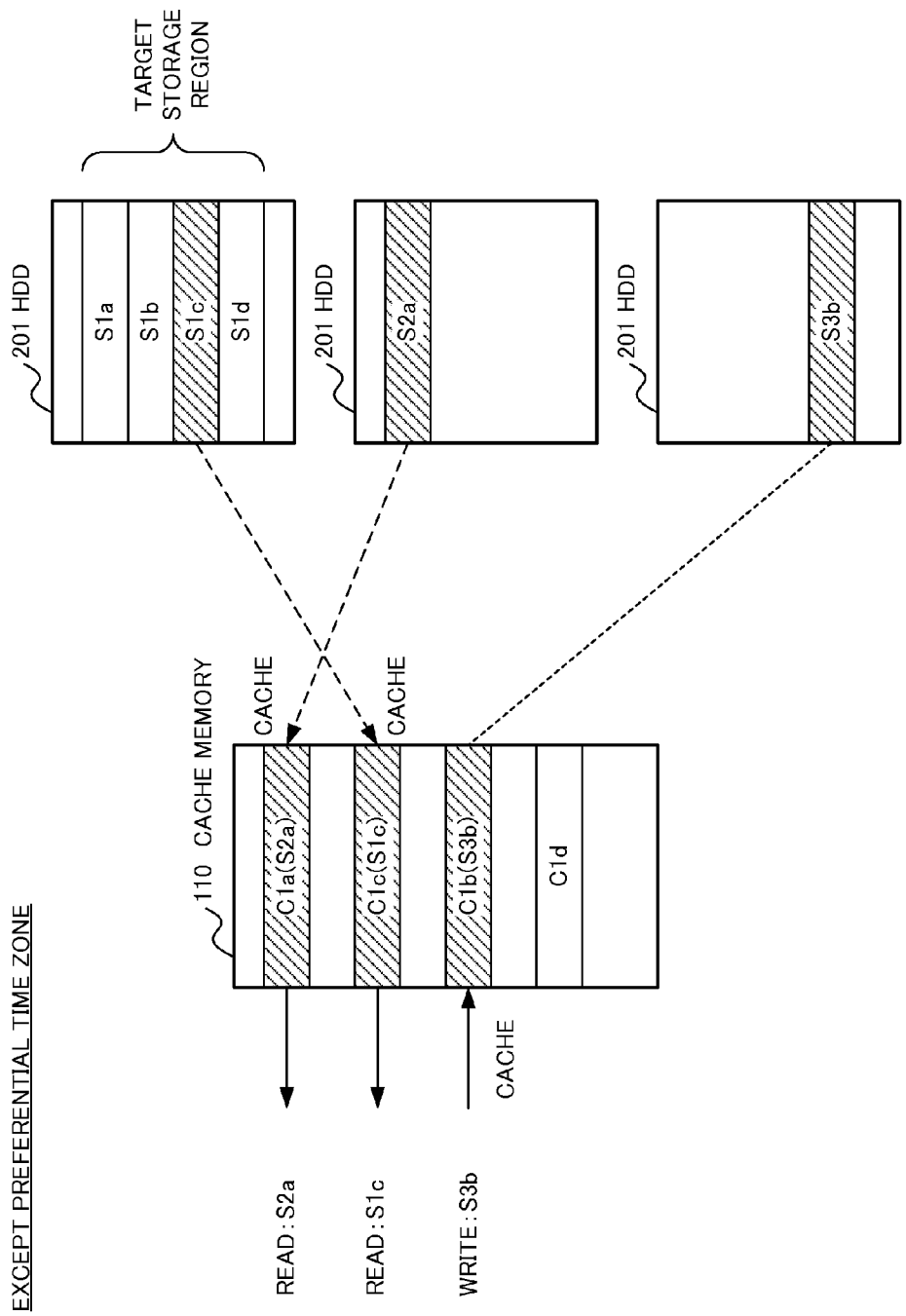

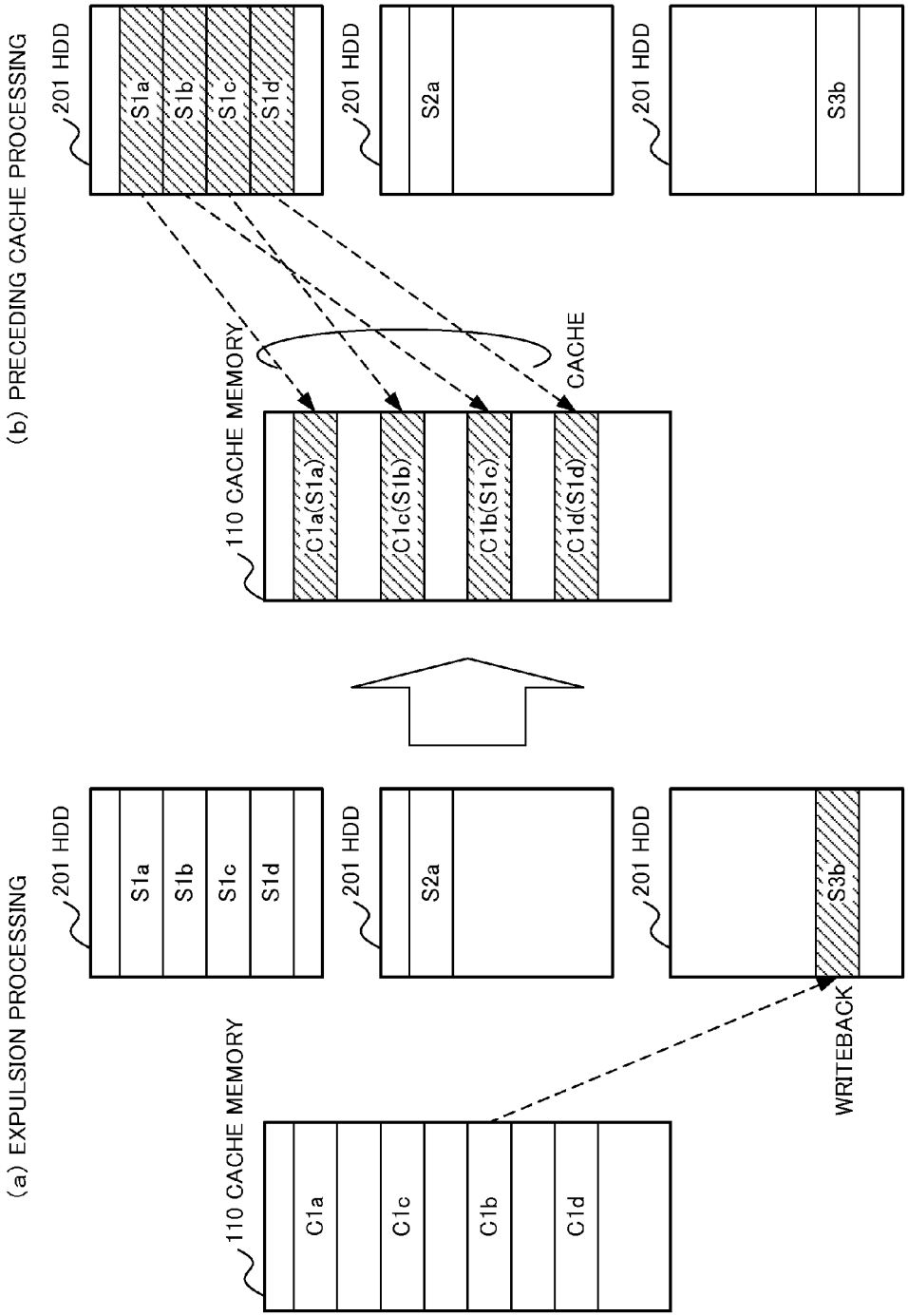

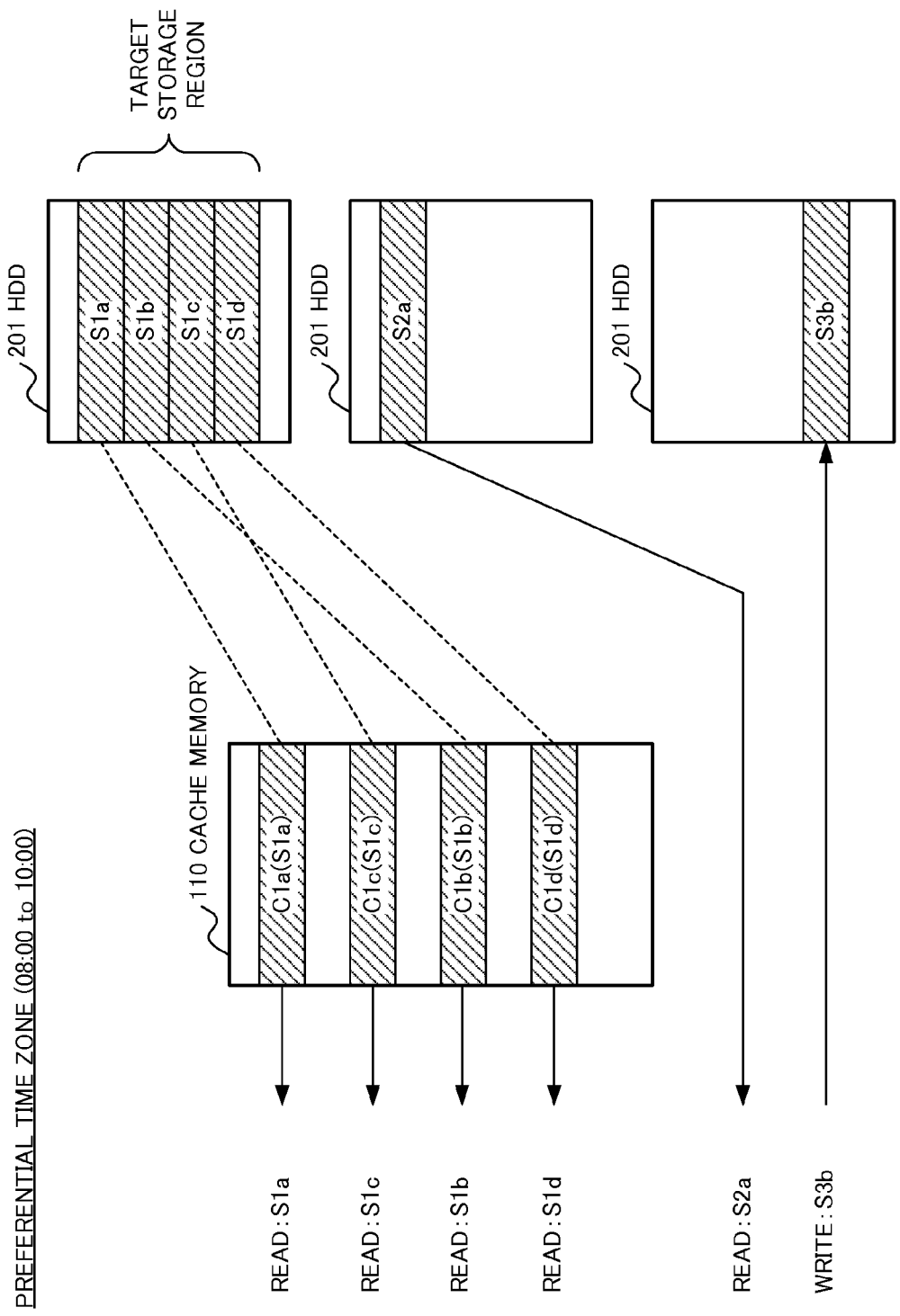

STORAGE CONTROL DEVICE AND STORAGE CONTROL METHOD FOR CACHE PROCESSING ACCORDING TO TIME ZONES

This application is based upon and claims the benefit of priority from Japanese Patent Application No. 2014-013893, filed on Jan. 29, 2014, the disclosure of which is incorporated herein in its entirety by reference.

TECHNICAL FIELD

The present invention relates to a storage control device and a storage control method, and in particular, to a storage control device and a storage control method for a cache control.

BACKGROUND ART

In a business system including a storage device, such as a disk array device, using an HDD (Hard Disk Device) as a storage medium, concentration of accesses to a certain region on the storage device in a certain time zone may decrease the performance of the entire system.

For example, when a plurality of client devices included in the business system read system information for activation in a time zone of a start of business, accesses to a region on the storage device which stores the system information are concentrated.

As a method for avoiding such a decrease in performance due to accesses to a certain region, the following methods are known.

(1) An HDD (Hard Disk Drive) is added to a storage device for load dispersion.

(2) Data is rearranged on a storage medium (an SSD (Solid State Drive), a higher-speed HDD, and the like) capable of realizing higher-speed access.

(3) A capacity of a cache memory used for a primary cache using a RAM (Random Access Memory) or the like is increased to enhance cache hit rate.

(4) A cache memory used for a secondary cache using an SSD, a FlashROM (Read Only Memory), or the like is introduced to enhance cache hit rate.

In the method where a cache memory is added as described above in (3) and (4), when a large access load is applied to a storage device, the cache memory operates to reduce an access load applied to a region having become the cause. Therefore, depending on an operation status, a cache memory may have been already used in a certain time zone where a decrease in performance needs to be avoided, since the cache memory caches data of a region other than a region which is the cause of the decrease in performance in the certain time zone. In this case, the added cache memory is not effectively used.

Japanese Laid-open Patent Publication No. 2009-157749, for example, discloses a method for effectively using a cache memory for such accesses to a certain region in a certain time zone.

The storage system disclosed in Japanese Laid-open Patent Publication No. 2009-157749 sets priority related to the use of a cache memory for each of a plurality of pieces of data for every time zone and determines a piece of data for which a cache memory is used in each time zone based on the set priority.

As a related technology, Japanese Laid-open Patent Publication No. 2003-337721 discloses a technique for changing a storage configuration in accordance with a storage configuration change schedule predetermined by an administrator.

SUMMARY

An exemplary object of the present invention is to provide a storage control device and a storage control method capable of avoiding a decrease in performance related to accesses to a storage device from a start time of a certain time zone.

A storage control device according to an exemplary aspect of the invention includes: a schedule information storing unit which stores schedule information indicating target data in an access to a storage device in a predetermined time zone, the target data being a target of a cache control using a cache memory; a cache processing unit which performs the cache control using the cache memory for the access to the target data and an access to data other than the target data in a time zone except the predetermined time zone, and performs the cache control using the cache memory for the access to the target data in the predetermined time zone; and a preprocessing unit which performs a preprocessing to make the cache memory available for the cache control of the target data by a start time of the predetermined time zone.

A storage control method according to an exemplary aspect of the invention includes: storing schedule information indicating target data in an access to a storage device in a predetermined time zone, the target data being a target of a cache control using a cache memory; performing the cache control using the cache memory for the access to the target data and an access to data other than the target data in a time zone except the predetermined time zone, and performing the cache control using the cache memory for the access to the target data in the predetermined time zone; and performing a preprocessing to make the cache memory available for the cache control of the target data by a start time of the predetermined time zone.

A non-transitory computer readable storage medium recording thereon a program, according to an exemplary aspect of the invention causes a computer to perform a method including: storing schedule information indicating target data in an access to a storage device in a predetermined time zone, the target data being a target of a cache control using a cache memory; performing the cache control using the cache memory for the access to the target data and an access to data other than the target data in a time zone except the predetermined time zone, and performing the cache control using the cache memory for the access to the target data in the predetermined time zone; and performing a preprocessing to make the cache memory available for the cache control of the target data by a start time of the predetermined time zone.

BRIEF DESCRIPTION OF THE DRAWINGS

Exemplary features and advantages of the present invention will become apparent from the following detailed description when taken with the accompanying drawings in which:

FIG. 4 is a table illustrating an example of schedule information 131 in the exemplary embodiment of the present invention;

FIG. 6 is a diagram illustrating an example of a usual cache control in the exemplary embodiment of the present invention;

FIG. 7 is a diagram illustrating an example of a preprocessing in the exemplary embodiment of the present invention; and FIG. 8 is a diagram illustrating an example of a preferential cache control in the exemplary embodiment of the present invention.

EXEMPLARY EMBODIMENT

Next, an exemplary embodiment of the present invention will be described.

Figure 2:
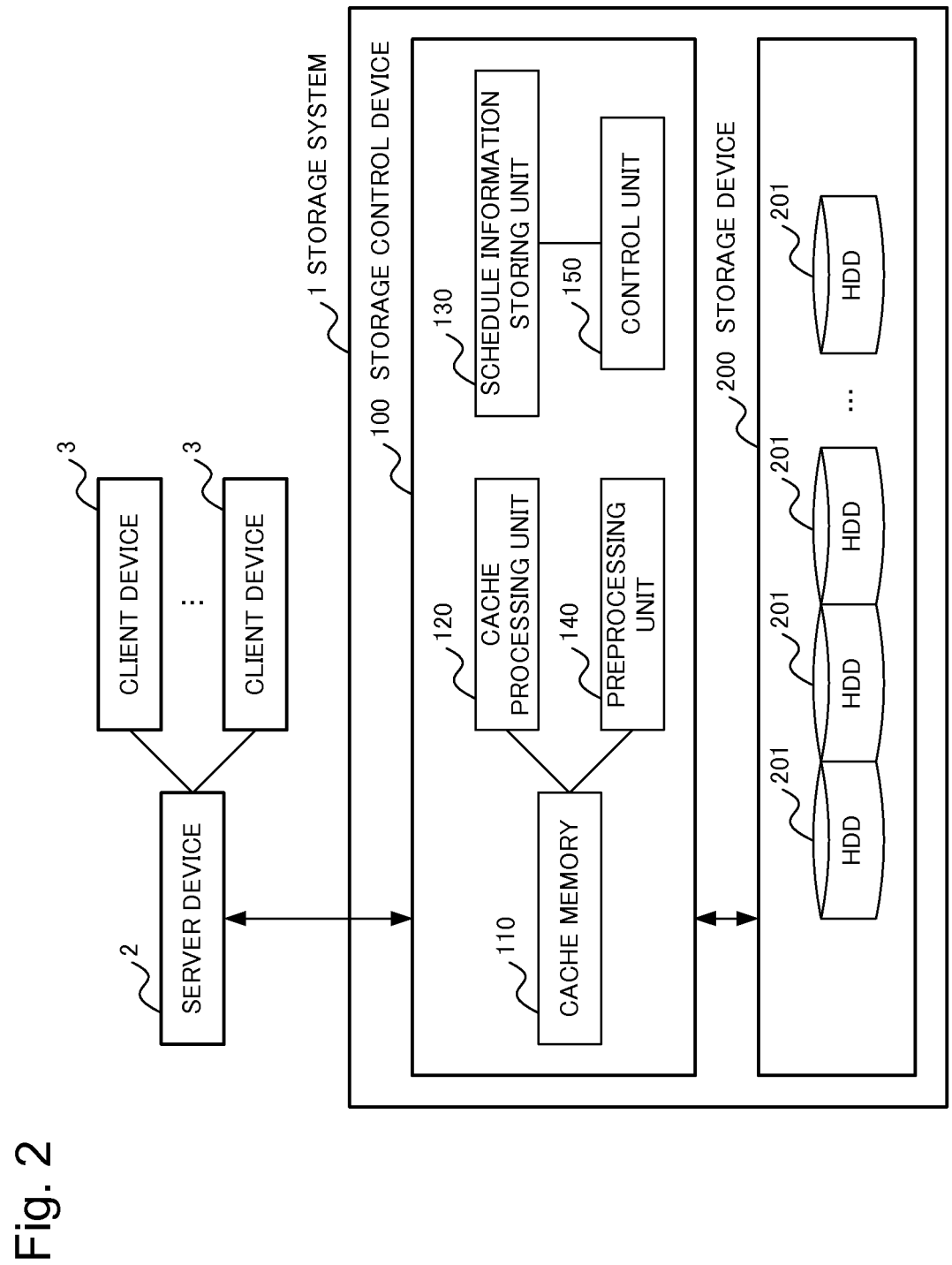
FIG. 2 is a block diagram illustrating a configuration of a business system in the exemplary embodiment of the present invention.

Initially, a configuration of the exemplary embodiment of the present invention is described below. FIG. 2 is a block diagram illustrating a configuration of a business system in the exemplary embodiment of the present invention. The business system includes a storage system 1, a server device 2, and a client device 3. The storage system 1 and the server device 2, as well as the server device 2 and the client device 3, are connected with each other over a network or the like.

The storage system 1 stores a program used in a business system, setting information thereof, business data used by the program, and the like. Hereinafter, the program, the setting information, the business data, and the like are collectively referred to as data. The server device 2 reads data from the storage system 1 and writes data onto the storage system 1 in response to a request from the client device 3.

The storage system 1 includes a storage control device 100 and a storage device 200. The storage device 200 includes at least one HDD 201 as a storage medium for storing the data described above. The at least one HDD 201 may be configured as a disk array. Further, the storage device 200 may include another storage medium such as an SSD as a storage medium.

The storage control device 100 includes a cache memory 110, a cache processing unit 120, a schedule information storing unit 130, a preprocessing unit 140, and a control unit 150.

The cache memory 110 is a storage medium such as a RAM and an SSD which caches data upon reading the data from the storage device 200 and writing the data onto the storage device 200. The cache memory 110 may have a multi-stage configuration including a primary cache using a RAM or the like and a secondary cache using an SSD or the like.

The cache processing unit 120 performs the following cache control regardless of a storage region of data on the storage device 200 in a time zone except a preferential time zone indicated by schedule information 131. The cache control performed regardless of a storage region of data on the storage device 200 is referred to as a usual cache control herein.

The cache processing unit 120 reads, from the storage device 200, data read-requested from the server device 2, transmits the data to the server device 2, and also writes (caches) the data onto the cache memory 110. When the data read-requested from the server device 2 is present (i.e., is being cached) on the cache memory 110, the cache processing unit 120 reads the data from the cache memory 110 and transmits the read data to the server device 2. Further, the cache processing unit 120 writes (caches) data write-requested from the server device 2 onto the cache memory 110. The cache processing unit 120 writes (writes back) the updated data on the cache memory 110 onto the storage device 200 at a predetermined writeback timing. Further, the cache processing unit 120 erases data on the cache memory 110 at a predetermined erasure timing.

A piece of data to be read from and a piece of data to be written onto the storage device 200 are specified by addresses on the storage device 200.

Further, an address for caching a piece of data on the cache memory 110 is determined by a hash value obtained by applying an address for storing the piece of data on the storage device 200 to a predetermined hash function. Upon caching a piece of data of a given address on the storage device 200 into a corresponding address on the cache memory 110, when a piece of data of another address on the storage device 200 is cached, no cache operation is performed. In other words, in this case, the cache processing unit 120 performs no cache operation for the cache memory 110 but preforms read and write operations with respect to the storage device 200.

The cache processing unit 120 further performs a preferential cache control according to a storage region of a piece of data on the storage device 200 in a preferential time zone indicated by the schedule information 131. The cache processing unit 120 performs a preferential cache control for a piece of data (target data) to be stored in a target storage region associated with the preferential time zone.

FIG. 4 is a table illustrating an example of the schedule information 131 in the exemplary embodiment of the present invention. In the example of FIG. 4, the schedule information 131 includes a preferential time zone (a start time and a termination time), a target storage region and an operation mode associated with the preferential time zone.

The preferential time zone refers to a time zone in which a cache control for a piece of target data is preferentially performed. The target storage region refers to an address rang on the storage device 200 for storing the piece of target data. The operation mode refers to a preprocessing to be completed by the preprocessing unit 140 by a preferential start time. When the operation mode is set as "write priority," the preprocessing unit 140 performs an expulsion processing to be described later as the preprocessing. When the operation mode is set as "read priority," the preprocessing unit 140 performs a preceding cache processing to be described later in addition to an expulsion processing as the preprocessing.

The cache processing unit 120 performs the cache control described above for a piece of target data in a preferential time zone indicated by the schedule information 131. However, the cache processing unit 120 performs no cache control described above for a piece of data, other than the piece of target data, using the same region as a region (target cache region) used by the piece of target data on the cache memory 110 in the preferential time zone.

The cache processing unit 120 performs a cache control for a piece of data using a region other than the target cache region on the cache memory 110 also in the preferential time zone.

The schedule information storing unit 130 stores the schedule information 131.

The preprocessing unit 140 completes the preprocessing for the target cache region on the cache memory 110 by a start time of the preferential time zone in accordance with an operation mode indicated by the schedule information 131.

The control unit 150 determines a start time of a preprocessing (a preprocessing start time) in accordance with the schedule information 131.

The storage control device 100 includes a CPU (Central Processing Unit) and a storage medium storing a program, and may be a computer which operates by being controlled based on the program.

Next, an operation of the storage control device 100 in the exemplary embodiment of the present invention will be described.

Figure 3:
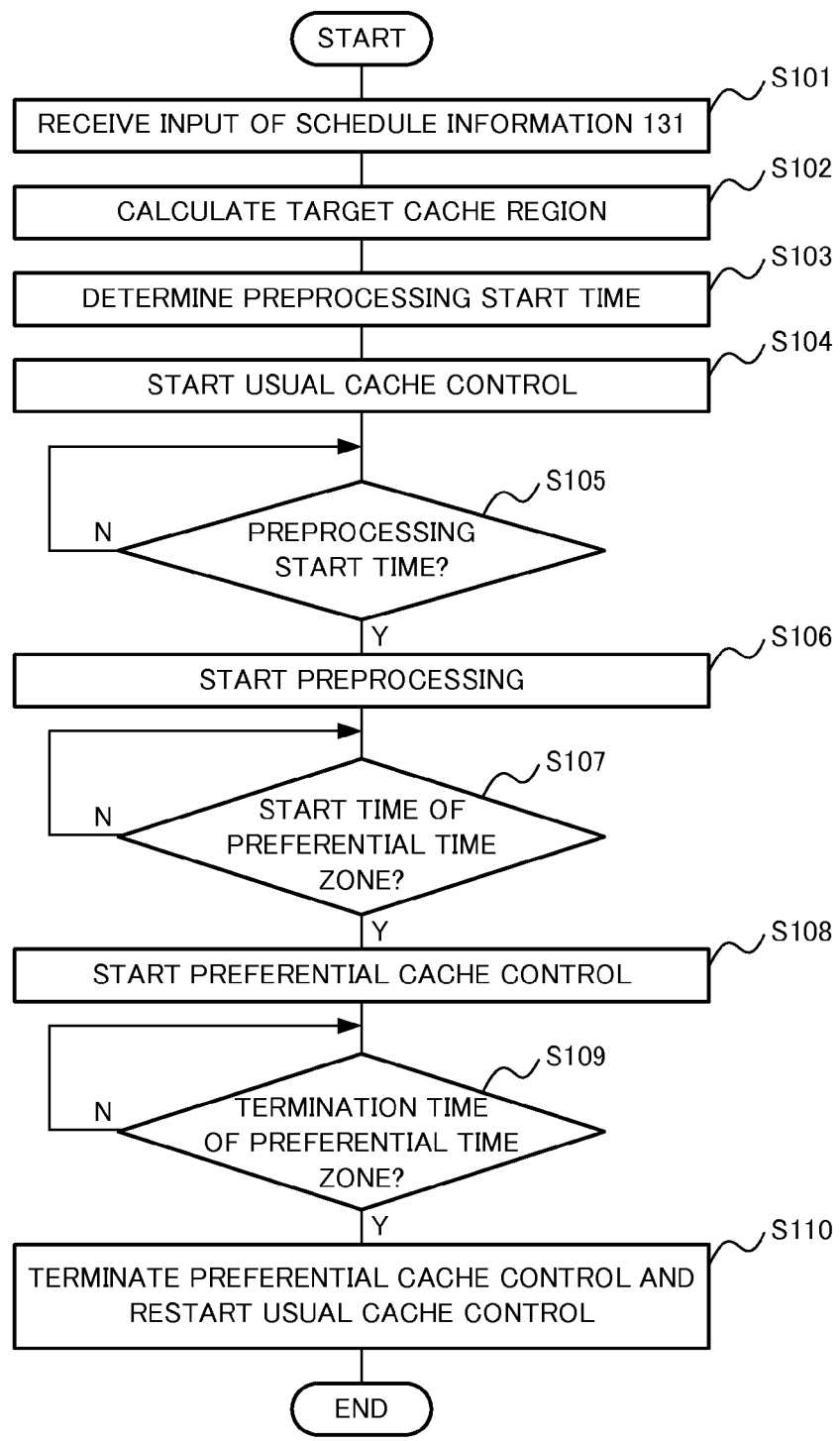
FIG. 3 is a flowchart illustrating a processing of a storage control device 100 in the exemplary embodiment of the present invention.

FIG. 3 is a flowchart illustrating a processing of the storage control device 100 in the exemplary embodiment of the present invention.

The control unit 150 of the storage control device 100 receives an input of the schedule information 131 from an administrator or the like via an input unit (not illustrated) (step S101). The control unit 150 stores the schedule information 131 on the schedule information storing unit 130.

For example, the control unit 150 stores the schedule information 131 as illustrated in FIG. 4 on the schedule information storing unit 130.

The control unit 150 calculates a target cache region on the cache memory 110 to be used by a piece of data (target data) of a target storage region on the storage device 200 indicated by the schedule information 131 (step S102).

Figure 5:
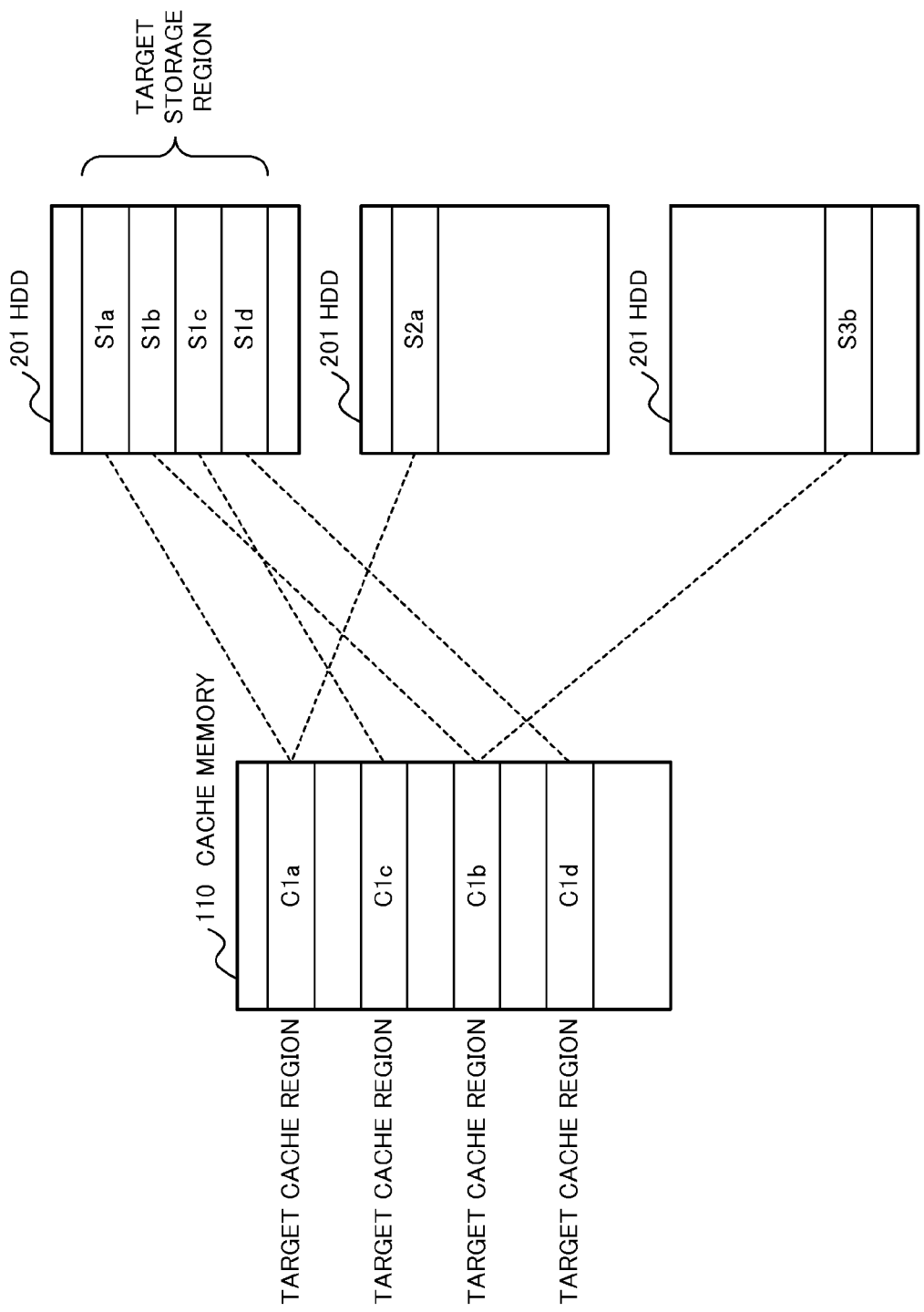
FIG. 5 is a diagram illustrating an example of a target cache region in the exemplary embodiment of the present invention.

FIG. 5 is a diagram illustrating an example of the target cache region in the exemplary embodiment of the present invention.

For example, the control unit 150 calculates target cache regions C1a to d for target storage regions S1a to d indicated by the schedule information 131 of FIG. 4, respectively, using a predetermined hash function. In this case, it is assumed that cache regions for storage regions S2a and S3b different from the target storage regions are also the same as the target cache regions C1a and C1b, respectively (hash values of the target storage regions S1a and S1b and hash values of the storage regions S2a and S3b are the same, respectively).

The control unit 150 determines a preprocessing start time for the target cache region calculated in step S102 in accordance with an operation mode indicated by the schedule information 131 (step S103).

When the operation mode is set as "write priority," the preprocessing unit 140 performs an expulsion processing as a preprocessing. The expulsion processing refers to a processing in which a piece of updated data of pieces of data stored in a target cache region is written (written back) onto the storage device 200 and the target cache region is made empty (a state where a piece of target data is writable in the target cache region). When the operation mode is set as "read priority," the preprocessing unit 140 performs a preceding cache processing in addition to an expulsion processing as a preprocessing. The preceding cache processing refers to a processing in which a piece of data already stored in a target storage region on the storage device 200 is read and then written (cached) in a target cache region on the cache memory 110. The control unit 150 calculates a period of time necessary for the preprocessing (the expulsion processing, or both of the expulsion processing and the preceding cache processing) based on access times and the like with respect to the storage device 200 and the cache memory 110. The control unit 150 determines a time, as a preprocessing start time, which precedes a start time of the preferential time zone by at least the calculated period of time necessary for the preprocessing.

For example, the control unit 150 calculates "one hour" as a period of time necessary for both of the expulsion processing and the preceding cache processing for the target cache regions C1a to d, since the operation mode indicated by the schedule information 131 of FIG. 4 is set as "read priority." The control unit 150 determines "07:00," as a preprocessing start time, which precedes a start time "8:00" of the preferential time zone by "one hour."

The cache processing unit 120 starts a usual cache control (step S104).

FIG. 6 is a diagram illustrating an example of the usual cache control in the exemplary embodiment of the present invention.

For example, the cache processing unit 120 performs a cache processing, as a usual cache control, for a piece of target data to be stored in a target storage region S1c which uses the target cache region C1c as illustrated in FIG. 6. Further, the cache processing unit 120 performs a cache processing also for pieces of data to be stored in the storage regions S2a and S3b which use the target cache regions C1a and C1b, respectively, where these pieces of data are pieces of data other than the piece of target data.

At the preprocessing start time determined in step S103 (step S105/Y), the preprocessing unit 140 starts a preprocessing in accordance with an operation mode indicated by the schedule information 131 (step S106).

When the operation mode is set as "write priority," the preprocessing unit 140 performs an expulsion processing as the preprocessing. When the operation mode is set as "read priority," the preprocessing unit 140 performs a preceding cache processing in addition to the expulsion processing as the preprocessing.

The preprocessing unit 140 completes the preprocessing by the start time of the preferential time zone.

FIG. 7 is a diagram illustrating an example of the preprocessing in the exemplary embodiment of the present invention.

For example, the preprocessing unit 140 starts a preprocessing at a preprocessing start time "07:00." The preprocessing unit 140 writes (writes back) a piece of updated data cached in the target cache region C1b into the storage region S3b by an expulsion processing as illustrated in a state (a) of FIG. 7 and makes the target cache regions C1a to d empty. The preprocessing unit 140 writes (caches) pieces of data already stored in the target storage regions S1a to d into the target cache regions C1a to d, respectively, by a preceding cache processing as illustrated in a state (b) of FIG. 7. The preprocessing unit 140 completes the preprocessing by the start time "08:00" of the preferential time zone.

It is possible that the cache processing unit 120 performs no cache operation into a target cache region except a write operation by a preceding cache processing from the preprocessing start time to the start time of the preferential time zone.

At the start time of the preferential time zone indicated by the schedule information 131 (step S107/Y), the cache processing unit 120 starts a preferential cache control for a piece of target data (step S108).

FIG. 8 is a diagram illustrating an example of the preferential cache control in the exemplary embodiment of the present invention.

For example, the cache processing unit 120 performs a cache processing, for pieces of target data to be stored in the target storage regions S1a to S1d as illustrated in FIG. 8, as a preferential cache control for a preferential time zone "08:00 to 10:00." However, the cache processing unit 120 performs no cache processing for pieces of data stored in the storage regions S2a and S3b.

In this manner, a preferential cache processing is performed for pieces of target data to be stored in the target storage regions from the start time of the preferential time zone "08:00 to 10:00."

At the termination time of the preferential time zone indicated by the schedule information 131 (step S109/Y), the cache processing unit 120 terminates the preferential cache control and then restarts a usual cache control (step S110).

For example, the cache processing unit 120 terminates the preferential cache control at the termination time "10:00" of the preferential time zone and then restarts a usual cache control as illustrated in FIG. 6.

By the above-described manner, the operation of the exemplary embodiment of the present invention is completed.

Figure 1:
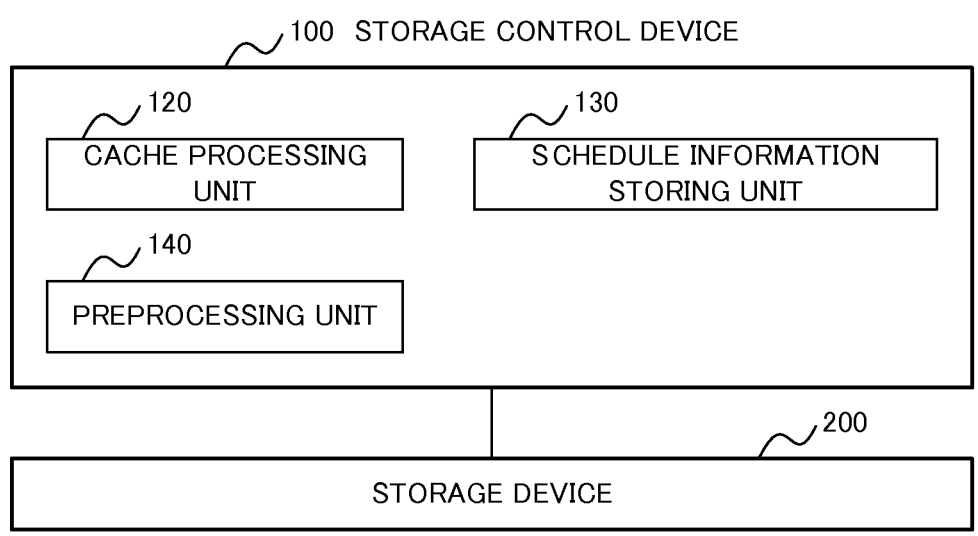
FIG. 1 is a block diagram illustrating a characteristic configuration of an exemplary embodiment of the present invention.

Next, a characteristic configuration of the exemplary embodiment of the present invention will be described. FIG. 1 is a block diagram illustrating a characteristic configuration of the exemplary embodiment of the present invention.

Referring to FIG. 1, a storage control device 100 of the present invention includes a schedule information storing unit 130, a cache processing unit 120, and a preprocessing unit 140.

The schedule information storing unit 130 stores schedule information 131 indicating target data in an access to a storage device 200 in a predetermined time zone. The target data is a target of a cache control using a cache memory 110.

The cache processing unit 120 performs the cache control using the cache memory 110 for the access to the target data and an access to data other than the target data in a time zone except the predetermined time zone. The cache processing unit 120 performs the cache control using the cache memory 110 for the access to the target data in the predetermined time zone.

The preprocessing unit 140 performs a preprocessing to make the cache memory 110 available for the cache control of the target data by a start time of the predetermined time zone.

Next, advantageous effects of the exemplary embodiment of the present invention will be described.

In the technique disclosed in Japanese Laid-open Patent Publication No. 2009-157749 described above, at a start time of a certain time zone, a cache memory may be used as a cache of another region. Therefore, from the start time of the certain time zone, an effect due to a preferential allocation of the cache memory is not always obtained.

According to the exemplary embodiment of the present invention, it is possible to avoid a decrease in performance related to accesses to the storage device from a start time of a certain time zone. This is because the preprocessing unit 140 performs a preprocessing to make a cache memory available for a cache control of target data by the start time of the certain time zone.

This makes it possible to access at high speed a certain region of the storage device 200, in which accesses are concentrated in the certain time zone and which is predicted to be the cause of a decrease in performance, from the start time of the certain time zone.

For example, it is assumed that in a business system, pieces of system information common to a plurality of client devices and pieces of information different among the respective client devices are stored in separate regions of the storage device 200. Then, it is assumed that the plurality of client devices read a piece of system information necessary for activation in a time zone of a start of business. In this case, the following setting to the schedule information 131 makes it possible to avoid a decrease in the performance of the business system. An administrator or the like sets a time zone of the start of business in a preferential time zone, sets a region storing a piece of common system information in a target storage region, and sets "read priority" to an operation mode. Thereby, at a start time of the time zone of the start of business, the piece of common system information is cached on the cache memory 110. Therefore, a plurality of client devices can read at high speed the piece of common system information cached on the cache memory 110 from the start time of the time zone of the start of business.

Further, according to the exemplary embodiment of the present invention, it is possible to avoid a decrease in performance without adding a new storage medium to be used as a cache memory. This is because the cache processing unit 120 performs a preferential cache control for target data in a certain time zone using the cache memory 110 used for a usual cache control.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A storage control device comprising:
a schedule information storing unit which stores schedule information indicating target data in an access to a storage device in a predetermined time zone, the target data being a target of a cache control using a cache memory;
a cache processing unit which performs the cache control using the cache memory for the access to the target data and an access to data other than the target data in a time zone except the predetermined time zone, and performs the cache control using the cache memory for the access to the target data in the predetermined time zone; and
a preprocessing unit which performs a preprocessing to make the cache memory available for the cache control of the target data by a start time of the predetermined time zone,
wherein the schedule information further indicates a mode of the preprocessing,
wherein the preprocessing unit is further configured to, in a case that the mode is a first mode, perform an expulsion processing which makes the cache memory empty without performing a preceding cache processing as the preprocessing, and start the preprocessing at a time which precedes the start time of the predetermined time zone by at least a period of time necessary for the expulsion processing, and
wherein the preprocessing unit is further configured to, in a case that the mode is a second mode, perform an expulsion processing which makes the cache memory empty and a preceding cache processing which caches the target data on the storage device onto the cache memory as the preprocessing, and start the preprocessing at a time which precedes the start time of the predetermined time zone by at least a total period of time necessary for the expulsion processing and the preceding cache processing.

2. The storage control device according to claim 1, wherein
the target data is cached in a target cache region on the cache memory;
the cache processing unit performs the cache control using the target cache region for the access to the target data and an access to data which is cached in the target cache region and which is other than the target data in a time zone except the predetermined time zone, and performs the cache control using the target cache region for the access to the target data in the predetermined time zone; and
the preprocessing unit performs the preprocessing for the target cache region.

3. The storage control device according to claim 2, wherein
data to be accessed on the storage device is specified by an address used for storing the data on the storage device;
a region where data is cached in the cache memory is determined by a hash value of an address used for storing the data on the storage device; and
the data which is cached in the target cache region and which is other than the target data is data stored in an address having the same hash value as the hash value of the address used for storing the target data on the storage device.

4. A storage control method comprising:
performing, based on schedule information indicating target data in an access to a storage device in a predetermined time zone, the target data being a target of a cache control using a cache memory, the cache control using the cache memory for the access to the target data and an access to data other than the target data in a time zone except the predetermined time zone, and performing the cache control using the cache memory for the access to the target data in the predetermined time zone; and
performing, based on the schedule information, a preprocessing to make the cache memory available for the cache control of the target data by a start time of the predetermined time zone,
wherein the schedule information further indicates a mode of the preprocessing,
wherein, in a case that the mode is a first mode, the performing the preprocessing comprises performing an expulsion processing which makes the cache memory empty without performing a preceding cache processing, and starting the preprocessing at a time which precedes the start time of the predetermined time zone by at least a period of time necessary for the expulsion processing, and
wherein, in a case that the mode is a second mode, performing the preprocessing comprises performing an expulsion processing which makes the cache memory empty and a preceding cache processing which caches the target data on the storage device onto the cache memory, and starting the preprocessing at a time which precedes the start time of the predetermined time zone by at least a total period of time necessary for the expulsion processing and the preceding cache processing.

5. The storage control method according to claim 4, wherein
the target data is cached in a target cache region on the cache memory,
when performing the cache control, performing the cache control using the target cache region for the access to the target data and an access to data which is cached in the target cache region and which is other than the target data in a time zone except the predetermined time zone, and performing the cache control using the target cache region for the access to the target data in the predetermined time zone, and
when performing the preprocessing, performing the preprocessing for the target cache region.

6. The storage control method according to claim 5, wherein
data to be accessed on the storage device is specified by an address used for storing the data on the storage device;
a region where data is cached in the cache memory is determined by a hash value of an address used for storing the data on the storage device; and
the data which is cached in the target cache region and which is other than the target data is data stored in an address having the same hash value as the hash value of the address used for storing the target data on the storage device.

7. A non-transitory computer readable storage medium recording thereon a program, causing a computer to perform a method comprising:
performing, based on schedule information indicating target data in an access to a storage device in a predetermined time zone, the target data being a target of a cache control using a cache memory, the cache control using the cache memory for the access to the target data and an access to data other than the target data in a time zone except the predetermined time zone, and performing the cache control using the cache memory for the access to the target data in the predetermined time zone; and
performing, based on the schedule information, a preprocessing to make the cache memory available for the cache control of the target data by a start time of the predetermined time zone,
wherein the schedule information further indicates a mode of the preprocessing,
wherein, in a case that the mode is a first mode, the performing the preprocessing comprises performing an expulsion processing which makes the cache memory empty without performing a preceding cache processing, and starting the preprocessing at a time which precedes the start time of the predetermined time zone by at least a period of time necessary for the expulsion processing, and
wherein, in a case that the mode is a second mode, the performing the preprocessing comprises performing an expulsion processing which makes the cache memory empty and a preceding cache processing which caches the target data on the storage device onto the cache memory, as the preprocessing, and starting the preprocessing at a time which precedes the start time of the predetermined time zone by at least a total period of time necessary for the expulsion processing and the preceding cache processing.

8. The non-transitory computer readable storage medium according to claim 7, recording thereon the program, causing the computer to perform the method, wherein,
the target data is cached in a target cache region on the cache memory,
when performing the cache control, performing the cache control using the target cache region for the access to the target data and an access to data which is cached in the target cache region and which is other than the target data in a time zone except the predetermined time zone, and performing the cache control using the target cache region for the access to the target data in the predetermined time zone, and when performing the preprocessing, performing the preprocessing for the target cache region.

9. The non-transitory computer readable storage medium according to claim 8 recording thereon the program, causing the computer to perform the method, wherein, data to be accessed on the storage device is specified by an address used for storing the data on the storage device;

a region where data is cached in the cache memory is determined by a hash value of an address used for storing the data on the storage device; and the data which is cached in the target cache region and which is other than the target data is data stored in an address having the same hash value as the hash value of the address used for storing the target data on the storage device.

10. A storage control device comprising:

a schedule information storing means for storing schedule information indicating target data in an access to a storage device in a predetermined time zone, the target data being a target of a cache control using a cache memory;

a cache processing means for performing the cache control using the cache memory for the access to the target data and an access to data other than the target data in a time zone except the predetermined time zone, and performing the cache control using the cache memory for the access to the target data in the predetermined time zone; and a preprocessing means for performing a preprocessing to make the cache memory available for the cache control of the target data by a start time of the predetermined time zone, wherein the schedule information further indicates a mode of the preprocessing, wherein the preprocessing means is further for, in a case that the mode is a first mode, performing an expulsion processing which makes the cache memory empty without performing a preceding cache processing, as the preprocessing, and starting the preprocessing at a time which precedes the start time of the predetermined time zone by at least a period of time necessary for the expulsion processing, and wherein the preprocessing means is further for, in a case that the mode is a second mode, performing an expulsion processing which makes the cache memory empty and a preceding cache processing which caches the target data on the storage device onto the cache memory, as the preprocessing, and starting the preprocessing at a time which precedes the start time of the predetermined time zone by at least a total period of time necessary for the expulsion processing and the preceding cache processing.

* * * * *